US012752858B2

(12) United States Patent
Lagin et al.

(10) Patent No.: US 12,752,858 B2
(45) Date of Patent: Oct. 6, 2026

(54) INSTRUMENT PANEL CARRIER FOR A MOTOR VEHICLE

(71) Applicant: Kirchhoff Automotive Deutschland GmbH, Attendorn (DE)

(72) Inventors: Stephan Lagin, Attendorm (DE); Jan Göbel, Netphen (DE)

(73) Assignee: Kirchhoff Automotive Deutschland GmbH, Attendorn (DE)

(*) Notice: Subject to any disclaimer, the term of this patent is extended or adjusted under 35 U.S.C. 154(b) by 268 days.

(21) Appl. No.: 18/706,486

(22) PCT Filed: Nov. 2, 2022

(86) PCT No.: PCT/EP2022/080524
§ 371 (c)(1),
(2) Date: May 1, 2024

(87) PCT Pub. No.: WO2023/078910
PCT Pub. Date: May 11, 2023

(65) Prior Publication Data
US 2025/0001867 A1 Jan. 2, 2025

(30) Foreign Application Priority Data
Nov. 3, 2021 (DE) ..................... 10 2021 128 569.0

(51) Int. Cl.
*B62D 25/14* (2006.01)
*B60K 37/10* (2024.01)

(52) U.S. Cl.
CPC ............ *B62D 25/145* (2013.01); *B60K 37/10* (2024.01)

(58) Field of Classification Search
CPC ....... B62D 25/145; B62D 25/14; B60K 37/10
(Continued)

(56) References Cited

U.S. PATENT DOCUMENTS 5,752,718 A * 5/1998 Schnabel ............. B60R 21/045 296/72
8,939,497 B2 1/2015 Baudart
(Continued)

FOREIGN PATENT DOCUMENTS

DE 10121402 A1 11/2002
DE 102006044699 A1 4/2008
(Continued)

OTHER PUBLICATIONS

Pending U.S. Appl. No. 18/687,402, filed Feb. 28, 2024 (Grüssing et al.).
(Continued)

*Primary Examiner* — Roger L Pang
(74) *Attorney, Agent, or Firm* — Polson Intellectual Property Law P.C.; Margaret Polson; Christopher Sylvain

(57) ABSTRACT

An instrument panel carrier for a motor vehicle comprising at least two carrier parts following the longitudinal extension of the instrument panel carrier. The two carrier parts are spaced apart from one another by their facing end sections and connected to one another by a carrier part connector. The carrier part connector is profiled in the form of a laterally opening profile in the transverse direction relative to the longitudinal extension. Part of the instrument panel carrier is a strut connected to one of the two carrier parts next to the carrier part connector, and via which strut the instrument panel carrier is supported on the chassis of the motor vehicle, when installed in a motor vehicle.

15 Claims, 3 Drawing Sheets

(58) Field of Classification Search
USPC .......................................... 296/70, 72, 193.02
See application file for complete search history.

(56) References Cited

U.S. PATENT DOCUMENTS

| | | | | |
|---|---|---|---|---|
| 8,950,794 | B2 | 2/2015 | Lenkenhoff | |
| 9,446,799 | B2 | 9/2016 | Franzpötter | |
| 9,598,100 | B2 | 3/2017 | Lenkenhoff | |
| 9,764,764 | B2 | 9/2017 | Irle | |
| 10,005,495 | B2 | 6/2018 | Töller | |
| 10,577,025 | B2 | 3/2020 | Michler | |
| 10,882,559 | B2 | 1/2021 | Gündogan | |
| 11,072,373 | B2 * | 7/2021 | Hashimura | B62D 1/16 |
| 11,142,248 | B2 | 10/2021 | Günther | |
| 11,148,623 | B2 | 10/2021 | Günther | |
| 11,235,720 | B2 | 2/2022 | Höning | |
| 11,292,409 | B2 | 4/2022 | Töller | |
| 11,505,146 | B2 | 11/2022 | Weige | |
| 11,708,040 | B2 | 7/2023 | Günther | |
| 11,731,707 | B2 | 8/2023 | Tentscher | |
| 11,819,944 | B2 | 11/2023 | Töller | |
| 11,851,109 | B2 | 12/2023 | Weige | |
| 11,858,557 | B2 * | 1/2024 | Günther | B62D 25/145 |
| 11,858,577 | B2 | 1/2024 | Günther | |
| 11,912,218 | B2 | 2/2024 | Tlauka | |
| 11,975,763 | B2 | 5/2024 | Gündogan | |
| 11,987,192 | B2 | 5/2024 | Günther | |
| 12,024,007 | B2 | 7/2024 | Günther | |
| 12,024,106 | B2 | 7/2024 | Günther | |
| 2012/0273539 | A1 * | 11/2012 | Carter | B62D 25/145 224/545 |
| 2022/0314912 | A1 | 10/2022 | Töller | |
| 2023/0123267 | A1 | 4/2023 | Günther | |
| 2023/0131692 | A1 | 4/2023 | Lagin | |
| 2023/0166597 | A1 | 6/2023 | Günther | |
| 2023/0202567 | A1 | 6/2023 | Günther | |
| 2023/0406247 | A1 | 12/2023 | Lagin | |
| 2024/0166269 | A1 | 5/2024 | Günther | |
| 2024/0174036 | A1 | 5/2024 | Günther | |
| 2025/0083750 | A1 * | 3/2025 | Neul | B62D 25/145 |

FOREIGN PATENT DOCUMENTS

| | | | |
|---|---|---|---|
| DE | 102008045914 | A1 | 3/2010 |
| DE | 102013008510 | A1 | 11/2014 |
| DE | 102019131425 | A1 | 5/2021 |
| JP | 2020082979 | A | 6/2020 |
| KR | 1020120040548 | A | 4/2012 |

OTHER PUBLICATIONS

Pending U.S. Appl. No. 18/687,461, filed Feb. 28, 2024 (Gündogan et al.).

International Search Report (ISR) of the International Searching Authority (ISA-EPO) mailed Jan. 24, 2023 in parent international application PCT/EP2022/080524.

Written Opinion (WO) of the International Searching Authority (ISA-EPO) mailed Jan. 24, 2023 in parent international application PCT/EP2022/080524.

* cited by examiner

INSTRUMENT PANEL CARRIER FOR A MOTOR VEHICLE

BACKGROUND

The disclosure relates to an instrument panel carrier for a motor vehicle comprising at least two carrier parts following the longitudinal extension of the instrument panel carrier. The two carrier parts are spaced apart from one another with their mutually facing end sections and connected to one another by a carrier part connector. The end faces of the carrier part connector are connected to the carrier parts, thereby forming a carrier part connection. The carrier part connector is profiled in the transverse direction relative to its longitudinal extension in the form of a laterally opening profile. As part of the instrument panel carrier, a strut is connected, in the longitudinal extension of the instrument panel carrier, to one of the two carrier parts next to the carrier part connector, via which the instrument panel carrier is supported on the vehicle chassis when installed in a motor vehicle.

Instrument panel carriers are used to mount instruments and the steering column in a vehicle. Such an instrument panel carrier is installed between two pillars, namely the A-pillars of a motor vehicle. To connect to the A-pillars, the instrument panel carrier has corresponding mechanical connectors at both ends. An essential component of such an instrument panel carrier is a carrier structure. This extends between the pillars of the vehicle's body. The carrier structure can be provided with connections for instruments as well as other fixing points relative to the vehicle, such as floor supports by which the carrier structure is supported with the floor of the vehicle, for example in the region of a tunnel.

An instrument panel carrier can, but does not have to, be straight. Often such a structure is structured so that parts of it are offset from one another with respect to their longitudinal extent. The carrier parts are typically tubular bodies, which can also be composed of two or more shells or shell parts. In addition to instrument panel carriers that are made from a continuous carrier tube body, there are those also used in which several carrier parts are provided following the longitudinal extension. Depending on the design of the desired instrument panel carrier, these are arranged axially aligned with one another or offset from one another with respect to their longitudinal extension. In the first case, a connecting sleeve is usually used to connect the two carrier parts. In an offset arrangement, a carrier part connector, in many cases a metal connector, is used to connect the two carrier parts. This bridges the offset between two adjacent carrier parts. Such instrument panel carriers can, for example, have a section in the central region that is set back from the two outer carrier parts in order to create space for the installation of a vehicle unit, for example the air conditioning system. The carrier structure is then extended around this unit.

An instrument panel carrier in which two carrier parts are connected to one another with the interposition of a metal carrier part connector is known, for example, from DE 10 2008 045 914 A1. This metal connector is composed of two half-shells which are arranged with their opening side facing each other and with their joints adjacent to each other in order to provide a hollow chamber profile in the section connecting the carrier parts. Each half shell provides a front stop for a carrier part. The two carrier parts are arranged in the region of the carrier part connector so as to overlap each other in the direction of their longitudinal extension. The two shells of the metal connector are in material connection with each other. The same applies to the connection of the connector to the two carrier parts to be connected to it. A similar design of a carrier part connector, in which the carrier parts to be connected are arranged offset with respect to their longitudinal axis, is known from U.S. Pat. No. 8,939,497 B2. This carrier part connector is also composed of two half shells, which are inserted into each other.

Instrument panel carriers made of steel components are coated to prevent possible corrosion. For example, in such a case, the instrument panel carriers are subjected as a whole to cathodic dip painting. A corrosion protection coating must be applied to the inside and outside of the hollow components of such an instrument panel carrier. In the case of the instrument panel carriers discussed above, it cannot be guaranteed that such a corrosion protection coating will completely reach the internal cavities of the carrier part connector and parts of the carrier parts to be connected to it.

Another module carrier for a motor vehicle is known from DE 10 2013 008 510 A1. In this previously known instrument panel carrier, two carrier parts arranged offset from one another are connected to one another by a connecting bushing. The connecting bushing is located at the upper end of a tunnel support. This is profiled in a U-shape, wherein the open side of the profiling points in the longitudinal direction of the instrument panel carrier. The connection bushing has two recesses that merge into one another. A carrier part engages with its free end in each recess. These lie against each other with their outer surface and are therefore not spaced apart from each other. The connecting bushing is closed by a locking plate, which completes the connecting bushing.

JP 2020-82979 A discloses a generic instrument panel carrier which is composed of several carrier parts. The carrier parts are offset from each other and arranged at a distance from each other. Two carrier parts are respectively connected to each other by a carrier part connector. The carrier part connectors are designed as U-shaped profile pieces. With their end faces, which are each adapted to the contour of the lateral surface of the carrier part to be connected, they are joined to the carrier parts. A tunnel support can be connected to such a carrier part.

A similar concept of a carrier part connection, as described above for JP 2020-82979 A, is also known from KR 10 2012 0040 548 A. In view of the increasing demands placed on lightweight construction, such an instrument panel carrier should also be as light as possible, have a simple structure, be able to be easily assembled by welding and, despite the use of at least two carrier parts connected to one another by a carrier part connection, be sufficiently rigid, in particular more rigid with regard to torsion.

SUMMARY

Proceeding from this background, one aspect of the disclosure is therefore to develop an instrument panel carrier of the type mentioned at the outset in such a way that, with regard to its carrier parts and carrier part connectors, it is better suited for an all-round corrosion protection coating, in particular applied by means of a cathodic dip painting process, and that this does not lead to an increase in the weight of the instrument panel carrier or to a complication of the component, and wherein the torsional rigidity is also improved.

This may be provided by an instrument panel carrier of the type mentioned at the outset, wherein the strut is arranged next to the carrier part connector in such a way that the properties of such a carrier part connector and those of the strut complement each other for stiffening the carrier part connection.

In this instrument panel carrier, the carrier part connector is designed as a laterally open profile. The carrier part connector is typically connected with its two end faces to the carrier parts to be connected to each other, for example by a material connection, in particular by welding. Due to the laterally open design of the carrier part connector, it can easily be coated on all sides with an anti-corrosive coating, in particular a cathodic dip coating. Another advantage with such a component is that the weld seam can, if desired, be placed on both sides for the purpose of joining the carrier part connector to the carrier parts. Advantageously, the carrier part connector is connected to the lateral surfaces of the two carrier parts so that the carrier parts, typically designed as tubular bodies, are open at least at the ends of the end sections to which such a carrier part connector is connected. This instrument panel carrier cleverly uses a strut to support the instrument panel carrier on the chassis of a motor vehicle when installed in the vehicle. Such a strut, for example designed as a tunnel strut, is typically already provided in such an instrument panel carrier. Of course, this can also be a strut that is supported on another chassis part, for example the front bulkhead of the vehicle interior. The strut is arranged next to the carrier connector part in such a way that the properties of the carrier connector part and those of the strut complement each other for stiffening the carrier part connection. Such a strut, which is typically also designed in the manner of a laterally open profile, replaces the wall, which is not present in the carrier part connector compared to previously known designs, due to the adjacent arrangement to the carrier part connector with regard to a rigidity of the carrier part connection, so that the carrier part connector has the intended laterally open profiling. In this respect, the carrier part connector and this strut are actively interacting or in a functional relationship with each other. Therefore, the distance between the carrier part connector and the strut in the direction of the longitudinal extension of the instrument panel carrier, if such a distance is provided between these two components, must not be too large. Due to the fact that the wall in the carrier part connector has been eliminated compared to certain prior art, the weight of the instrument panel carrier has actually been reduced without causing any loss of rigidity in the carrier part connection. Due to the adjacent arrangement of the carrier part connector and the strut supported on the chassis side, the carrier part connection is even more torsionally rigid than conventional carrier part connectors, for example those made up of two half shells to form a hollow chamber part. In addition, the rigidity of the instrument panel carrier in its carrier part connection can be increased by spacing the strut from the carrier part connector and/or by arranging the longitudinal axis of the strut and that of the carrier part connector at an angle to one another. This option can also influence the natural frequency of the instrument panel carrier by varying the design of the carrier part connectors. The disclosed instrument panel carrier cleverly exploits the fact that the carrier part connection ultimately has to exhibit the required rigidity only when installed in the vehicle.

In addition to the advantages described above, the production of such a carrier part connection is simple, also because no permanent cavities have to be taken into account. It is also advantageous that the carrier part connector can be easily adapted to the requirements and the available installation conditions, for example in that the side walls or legs of a U-shaped carrier part connector, for example, can be of different heights or lengths depending on the application, wherein a design is also possible in which the side walls of a carrier part connector have different heights.

Such a carrier part connector, for example made from a formed metal plate, can be stiffened by beads or other types of embossing.

When designing a carrier part connector with a U-shaped profile, the two side walls are connected to each other by a connecting web. Instead of a U-shaped profile, such a carrier part connector can also have a different cross-sectional profile, for example an H-shaped cross-section. Such a carrier connector is then typically a section of an extruded profile, such as a light metal alloy, such as an aluminum alloy.

The cross-sectional geometry of the carrier part connector can be the same along its length. It is also entirely possible to have a design in which the cross-sectional profiling changes in terms of its design and/or its size from one end of the carrier part connector to its other end. If, for example, the diameter of the two carrier parts of such an instrument panel carrier to be connected is different, it is advantageous for the cross-sectional area of the carrier part connector to decrease from the carrier part with the larger diameter to that with the smaller diameter, for example by the side walls being inclined in this direction, converging towards one another, wherein the height of the side walls can remain constant. This makes it possible for the connection to both carrier parts to be connected by the carrier part connector to occur with approximately the same circumferential extension.

In an embodiment in which the strut is also designed in the manner of a laterally open profile, the lateral opening of the carrier part connector and that of the strut point in the same direction according to one example embodiment.

Basically, it is intended that the carrier part connector with its longitudinal extension and the strut with its longitudinal extension point in the same direction, at least in the end section with which they are connected to the carrier part. This does not mean that they protrude in exactly the same direction from the carrier part to which they are connected. It is entirely possible to have a design in which the longitudinal extension of the strut forms an angle with that of the carrier part connector. However, this angle should not exceed about 30° to avoid loss in the rigidity of the instrument panel carrier in the connection direction of the two carrier parts.

Tubes or other hollow chamber profiles, including those composed of several shells, are used as carrier parts for example. These can be made of steel or a light metal alloy. In a preferred embodiment, the carrier parts are made of a steel material, as is the carrier part connector.

The two carrier parts of such an instrument panel carrier can be arranged with their end sections overlapping one another over a certain section in the longitudinal extension of the instrument panel carrier. The carrier part connector is then located in this overlapping section of the two carrier parts. The carrier part connector is preferably located in the immediate vicinity of the front end of the one carrier part to which the strut is not connected. This allows the strut to be connected with a small distance to the carrier part connector. It is also possible to design the instrument panel carrier in such a way that two carrier parts are offset but not overlapping with their end sections. In such a case, the carrier connector is shaped accordingly to connect the two carrier parts together.

Such an instrument panel carrier can also have more than two carrier parts, for example three carrier parts. In such a design of the instrument panel carrier, at least two carrier part connections are preferably designed as described above. Such a design of the instrument panel carrier allows its central carrier part to be arranged offset relative to the two adjacent carrier parts located on the outside in the direction of the longitudinal extension of the instrument panel carrier, for example in order to create installation space for certain functional units in a vehicle. In such a design, the offset of the central carrier part relative to the two adjacent carrier parts is directed in the same direction.

BRIEF DESCRIPTION OF THE DRAWINGS

The following description is provided using an example embodiment with reference to the figures, wherein.

DETAILED DESCRIPTION

Figure 1:
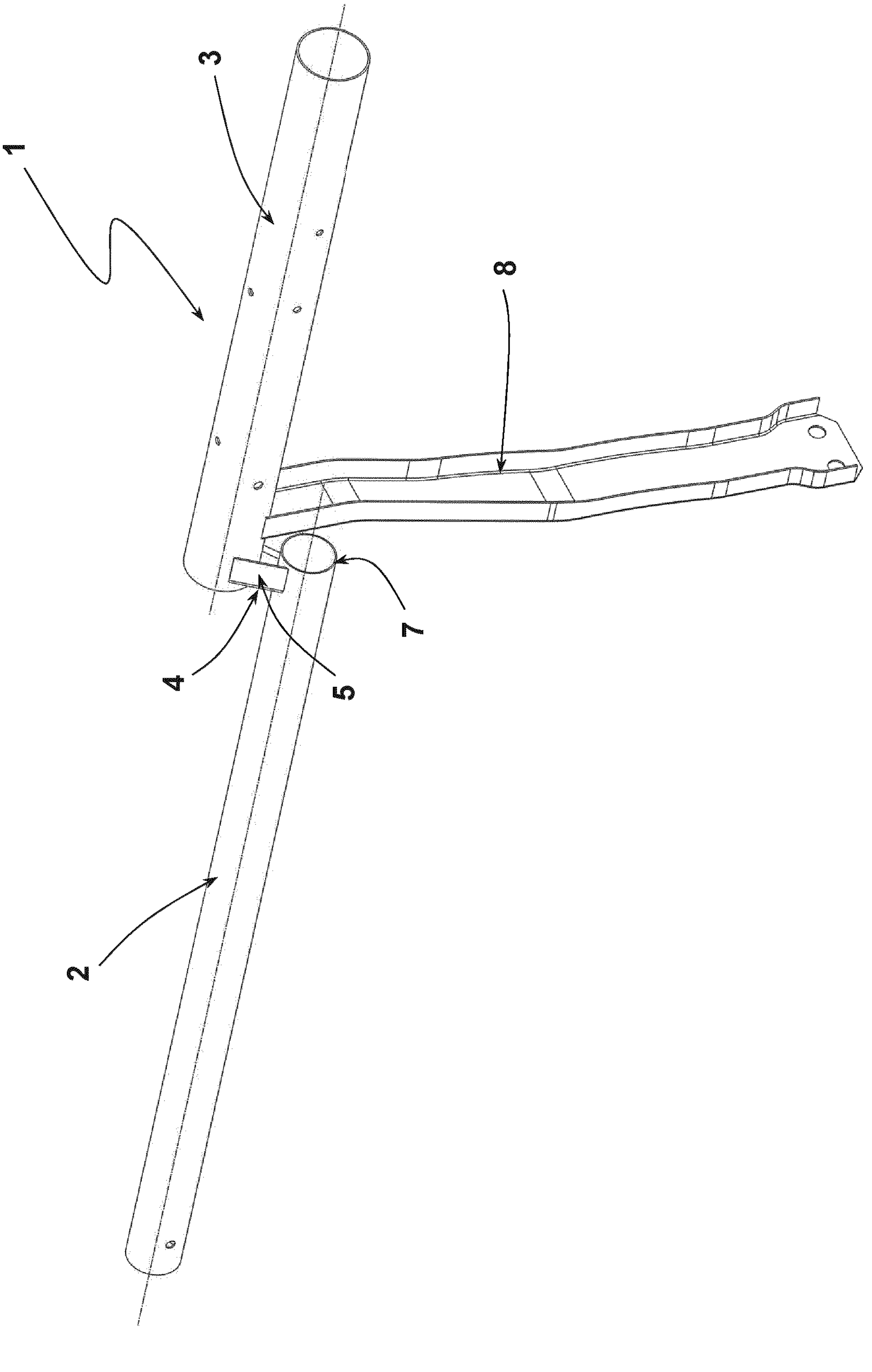
FIG. 1 shows a perspective view of a section of an instrument panel carrier with two interconnected carrier parts.
Figure 2:
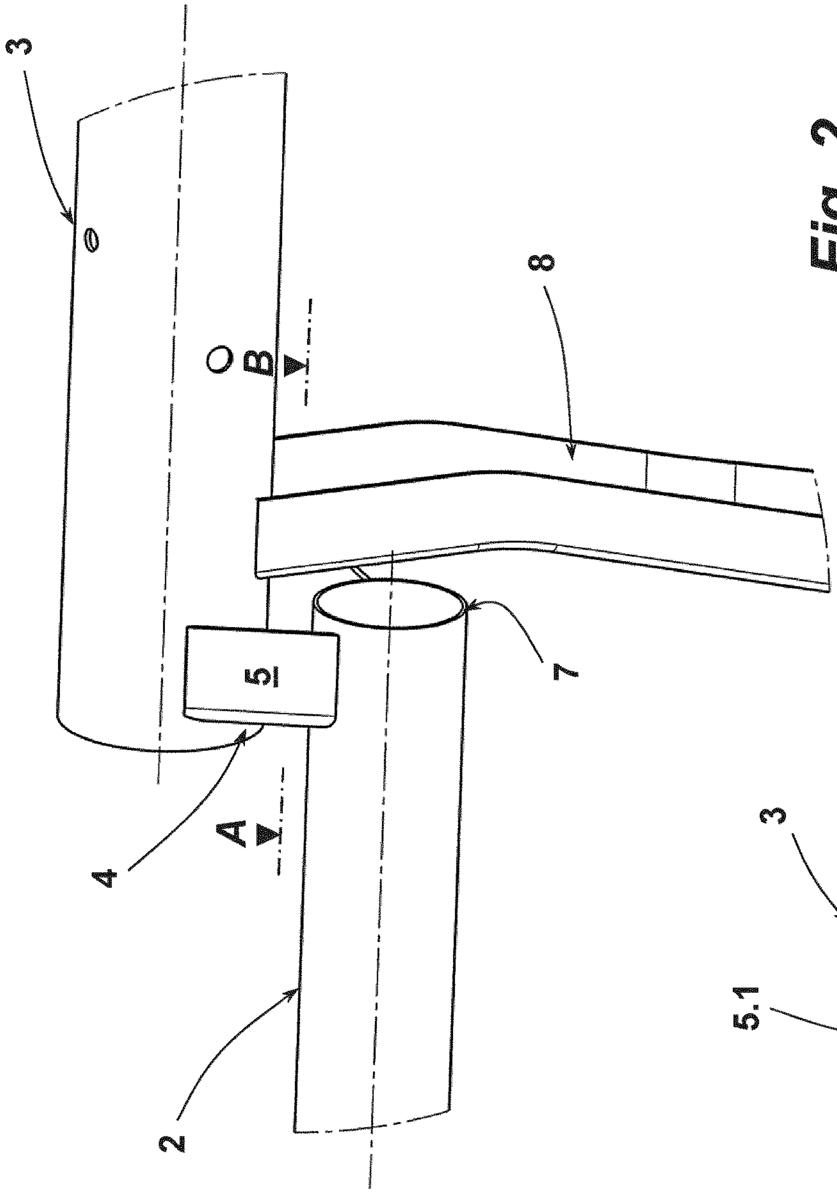
FIG. 2 shows an enlarged view of the carrier part connection of FIG. 1.

An instrument panel carrier 1 for a motor vehicle, to be installed between the A-pillars of the chassis, comprises several carrier parts, of which two carrier parts 2, 3 are shown in FIG. 1. The longitudinal extension of the instrument panel carrier 1 runs in the transverse direction of the vehicle (y-direction). The carrier parts 2, 3 of the illustrated example embodiment are steel tubes with a cylindrical lateral surface. The two carrier parts 2, 3 are offset and arranged at a distance from each other in the offset direction. The two carrier parts 2, 3 overlap in the direction of their longitudinal extension with their end sections pointing towards each other. In the overlapping region of the two carrier parts 2, 3, there is a carrier part connector 4 by which the two carrier parts 2, 3 are connected to each other. In the illustrated example embodiment, the longitudinal extension of the carrier part connector 4 extends at right angles to the longitudinal axis of the two carrier parts 2, 3, which are aligned parallel to each other with respect to their longitudinal axis. The carrier part connector 4 is a formed steel plate, namely formed in order to form a profiling transverse to its longitudinal extension. The longitudinal extension of the carrier part connector 4 corresponds to the direction in which the carrier part connector 4 connects the two carrier parts 2, 3. The profiling, which is U-shaped in the example embodiment shown, can be clearly seen in the sectional view in FIG. 3. Due to the profiling, the carrier part connector 4 has two side walls 5, 5.1 which are connected to each other by a web 6. In the illustrated embodiment, the height of the side walls 5, 5.1 is the same. The end faces of the carrier part connector 4 are adapted to the curvature of the lateral surface of the respective carrier part 2, 3. The diameter of the carrier parts 2, 3 is different. The diameter of carrier part 3 is slightly larger than that of carrier part 2. In order to connect the carrier part connector 4 to both carrier parts 2, 3 with approximately the same circumferential extent, the side walls 5, 5.1 are tapered towards one another when viewed from the direction of the end face connected to the carrier part 3. The end faces of the carrier part connector 4 are welded to the carrier parts 2, 3. The carrier part connector 4 is welded with its profile outer sides to the carrier parts 2, 3. This means that the length of the weld seam is shorter than that required for a hollow chamber profile.

At a distance from the carrier part connector 4 and the end 7 of the carrier part 2 in the direction of the longitudinal extension of the instrument panel carrier 1, a strut, which in the illustrated embodiment is a tunnel strut 8, is connected to the carrier part 3. The tunnel strut 8 is also U-shaped and welded to the carrier part 3 with its end side facing the carrier part 3. As can be seen from the figures, the tunnel strut 8 as well as the carrier part connector 4 are profiled with a lateral opening. In the embodiment shown, the opened sides point in the same direction. The distance of the tunnel strut 8 from the carrier part connector 4 in the direction of the longitudinal extension of the instrument panel carrier 1 is dimensioned such that the opening of the carrier part 2 at its end 7 is not closed by the tunnel strut 8. The tunnel strut 8 also does not close the opening side of the carrier part connector 4. Nevertheless, the distance between the tunnel strut 8 and the carrier part connector 4 is still so close that the carrier part connector 4, in cooperation with the tunnel strut 8 in the installed state of the instrument panel carrier 1, provides sufficient stiffening of the carrier part connection by the carrier part connector 4 to meet the requirements. In this respect, these two components-carrier connector 4 and tunnel strut 8—complement each other. Depending on the rigidity requirements placed on such an instrument panel carrier 1 when subjected to a load transverse to its longitudinal extent, this distance can be dimensioned differently. In one embodiment, the distance between the tunnel strut 8 and the carrier part connector is approximately 5-6 cm.

The carrier part connector 4 and the tunnel strut 8 protrude from the carrier part 3 in the same direction, even if the longitudinal axes of the carrier part 3 and the end section of the tunnel strut 8 form an angle of approximately 30° in the example embodiment shown.

Figure 3:
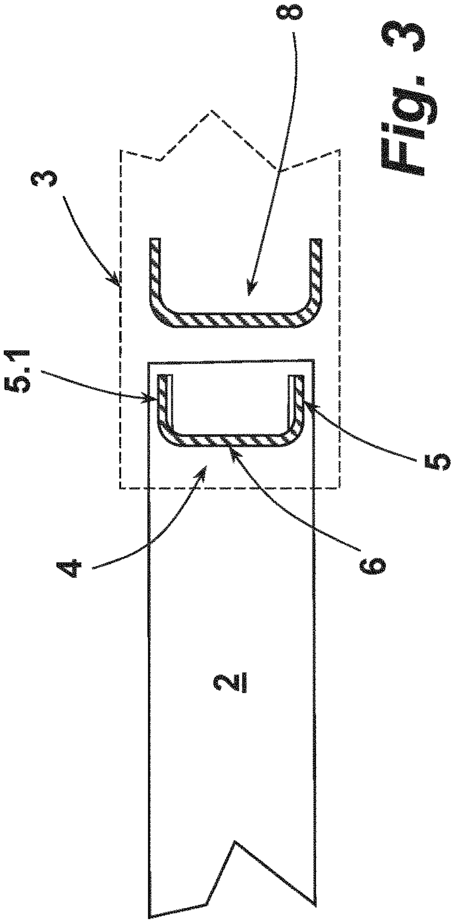
FIG. 3 shows a horizontal sectional view along the line A-B of FIG. 2 through the carrier part connection.

The overlap of the carrier parts 2, 3 and the arrangement of the carrier part connector 4 and tunnel strut 8 can be seen in the sectional view in FIG. 3.

Figure 4:
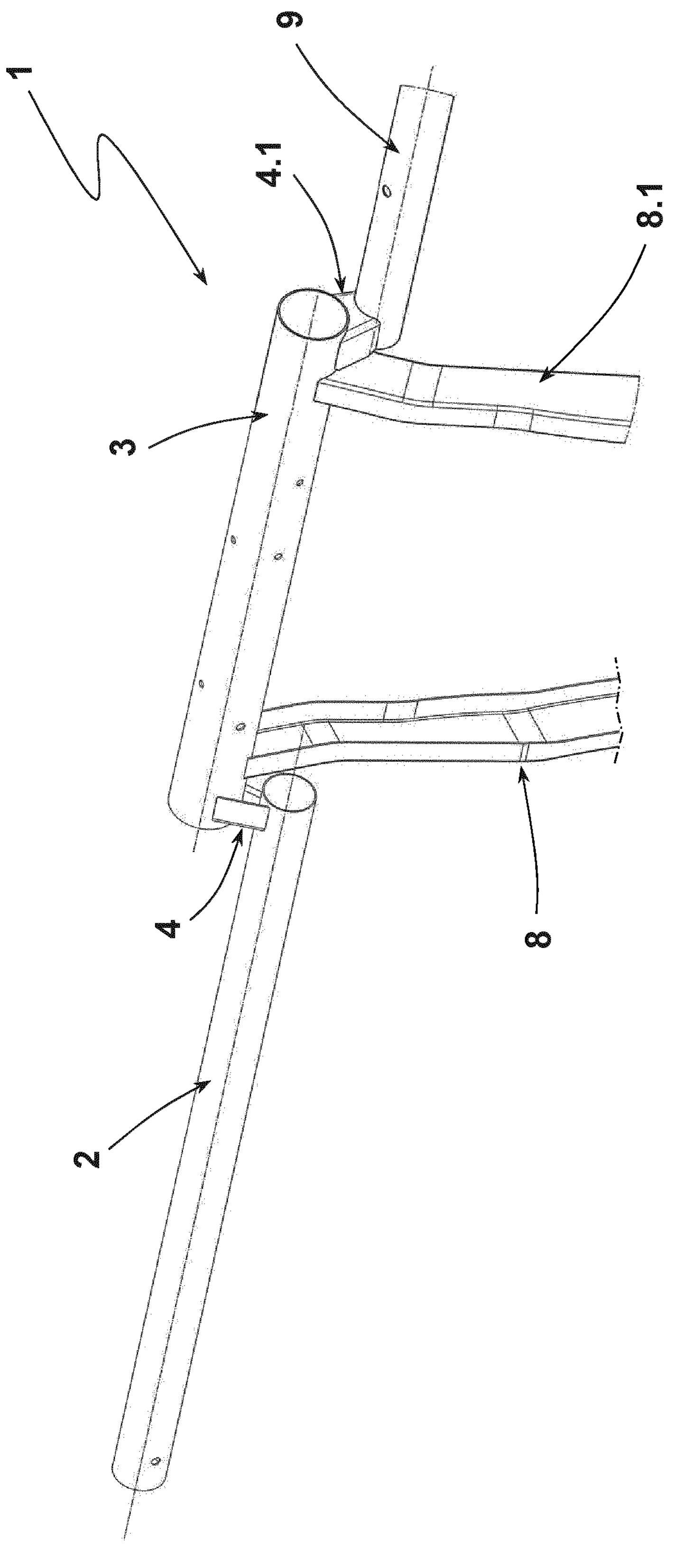
FIG. 4 shows the instrument panel carrier of FIG. 1 with another section thereof.

FIG. 4 shows the instrument panel carrier 1 in a more complete representation. In addition to the two carrier parts 2, 3 already described above, the instrument panel carrier 1 has a third carrier part 9 which is connected to the carrier part 3 in the same way as described for the carrier part connection between the carrier parts 2 and 3. The carrier part connector inserted into this connection is identified in FIG. 4 with the reference number 4.1. The tunnel strut of this carrier connection is indicated with 8.1. The perspective view of this carrier part connection-connection of the carrier parts 9 and 3—also shows the rear view of the carrier part connection between the carrier parts 2 and 3.

The struts 8, 8.1 are components formed from a metal plate.

In another example embodiment not shown in the figures, the end of the carrier part connector facing the strut is aligned with the end of the carrier part to which the strut is not connected. Then the strut, especially if its base or web points towards the carrier part connector, can contact the carrier part connector and be joined to it. In order to ensure that in such a design the end of the carrier part facing the strut, to which only the carrier part connector is connected, is not closed by the strut, the longitudinal axis of the strut is arranged at an angle to the longitudinal axis of the carrier part connector.

Due to its open components, the instrument panel carrier 1 can easily be coated with an anti-corrosive coating, in particular a cathodic dip-painting coating. There is no risk that certain surface portions, either inside or outside, will not be coated. In addition, since the carrier part connector, when made from a metal plate, typically consists of only one component, the manufacturing effort and thus also the handling costs are reduced. This also eliminates the need to join two half-shells together to form the carrier part connector according to the prior art.

LIST OF REFERENCE NUMERALS

1 Instrument panel carrier
2 Carrier part
3 Carrier part
4, 4.1 Carrier part connector
5, 5.1 Side wall
6 Web
7 End
8, 8.1 Tunnel strut
9 Carrier part

The invention claimed is:

1. An instrument panel carrier for a motor vehicle comprising:

at least two carrier parts following a longitudinal extension of the instrument panel carrier, a carrier part connector, and a strut, wherein respective end sections of the two carrier parts, which are adjacent in the longitudinal extension of the instrument panel carrier, are spaced apart from one another and connected to one another by the carrier part connector, thereby forming a carrier part connection, wherein the carrier part connector is profiled, transversely relative to a longitudinal extension of the carrier part connector, as a laterally open profile, wherein the strut is connected to one of the two carrier parts in the longitudinal extension of the instrument panel carrier next to the carrier part connector, and, when installed in the motor vehicle, the instrument panel carrier is supported via the strut on a chassis of the motor vehicle, wherein the strut is arranged next to the carrier part connector such that the carrier part connector and the strut complement each other in stiffening the carrier part connection, wherein the strut comprises a laterally open profile, and an open side of the laterally open profile of the carrier part connector and an open side of the laterally open profile of the strut face in the same direction.

2. The instrument panel carrier of claim 1, wherein the laterally open profile of the carrier part connector is designed as a U-shaped profile with two side walls and a web connecting the two side walls.

3. The instrument panel carrier of claim 2, wherein the two side walls of the carrier part connector have a different height.

4. The instrument panel carrier of claim 1, wherein the carrier part connector is stiffened by beads introduced therein.

5. The instrument panel carrier of claim 1, wherein the laterally open profile of the strut is designed as a U-shaped profile with two side walls and a web connecting the two side walls.

6. The instrument panel carrier of claim 5, wherein the laterally open profile of the carrier part connector is designed as a U-shaped profile with two side walls and a web connecting the two side walls.

7. The instrument panel carrier of claim 1, wherein a direction of a longitudinal extension of the strut, in which the strut projects from the respective carrier part to which the strut is connected, at least in an end section of the strut connected to the respective carrier part, encloses an angle of ≤30° with a direction of the longitudinal extension of the carrier part connector, in which the carrier part connector projects from the respective carrier part to which the strut is connected.

8. The instrument panel carrier of claim 1, wherein the carrier parts are designed as tubes.

9. The instrument panel carrier of claim 1, wherein the carrier part connector is a component formed from a metal plate.

10. The instrument panel carrier of claim 1, wherein the carrier part connector is welded to the two carrier parts.

11. The instrument panel carrier of claim 1, wherein the carrier part connector is connected, via end faces thereof in the longitudinal extension of the carrier part connector, to the two carrier parts.

12. The instrument panel carrier of claim 1, wherein the strut is a component formed from a metal plate.

13. The instrument panel carrier of claim 1, wherein the strut is a tunnel strut which, when the instrument panel carrier is installed in the motor vehicle, is connected to a floor-side tunnel of the chassis.

14. The instrument panel carrier of claim 1, wherein the instrument panel carrier comprises more than two carrier parts and at least two carrier part connectors.

15. The instrument panel carrier of claim 14, wherein the instrument panel carrier comprises three carrier parts, and wherein a middle carrier part is arranged offset relative to two lateral carrier parts pointing in the same direction.

* * * * *